United States Patent
Corsaro et al.

[11] Patent Number: 5,869,762
[45] Date of Patent: Feb. 9, 1999

[54] MONOLITHIC PIEZOELECTRIC ACCELEROMETER

[75] Inventors: Robert D. Corsaro, Waldorf; Joseph Klunder, New Carrolton, both of Md.

[73] Assignee: The United States of America as represented by the Secretary of the Navy, Washington, D.C.

[21] Appl. No.: 757,415

[22] Filed: Nov. 27, 1996

[51] Int. Cl.[6] ................................................. G01P 15/09
[52] U.S. Cl. .................................. 73/514.34; 310/329
[58] Field of Search .................... 73/514.34; 310/329, 310/369

[56] References Cited

U.S. PATENT DOCUMENTS

| 4,197,478 | 4/1980 | Silvus | 73/514.34 |
| 4,378,510 | 3/1983 | Bennett | 73/514.34 |
| 5,661,361 | 8/1997 | Lysen | 73/514.34 |

*Primary Examiner*—John E. Chapman
*Attorney, Agent, or Firm*—Thomas E. McDonnell; John Karasek

[57] ABSTRACT

A monolithic piezoelectric accelerometer of the longitudinal type having a mass element, a piezoelectric accelerometer sensor element and electrodes interconnecting the mass and sensor elements, in which the mass and sensor elements are formed as a monolithic structure. Included is the method for making the monolithic piezoelectric accelerometer.

3 Claims, 2 Drawing Sheets

MONOLITHIC PIEZOELECTRIC ACCELEROMETER

FIELD OF THE INVENTION

The present invention relates to monolithic piezoelectric accelerometers, and more particularly to a method of manufacturing such a monolithic piezoelectric accelerometer and the monolithic piezoelectric accelerometer thereby produced.

BACKGROUND OF THE INVENTION

Monolithic piezoelectric accelerometers and other piezoelectric accelerometers are known. Examples of such prior art piezoelectric accelerometers are seen in the following U.S. patents:

| U.S. Pat. No. | Date | To |
|---|---|---|
| 5,461,918 | 1995 | Mozurkewich |
| 5,193,392 | 1993 | Besson et al. |
| 5,138,414 | 1992 | Shinohara |
| 4,924,131 | 1990 | Nakayama et al. |
| 4,670,092 | 1987 | Motamedi |

Accelerometers have a wide range of application, including sound and vibration monitoring, and the detection and measurement of velocity changes. Hence a great many accelerometer sensor types have been devised, developed and made commercially available.

Each type of accelerometer has characteristics which make it more or less suitable for a particular application. For example, geophones are highly sensitive at very low frequencies; hence they are excellent for monitoring earthquakes. Conversely, miniature solid-state accelerometers are very cheap, quick, and easy to use. While they have very poor sensitivity, they fit the needs of sensors for triggering air bags.

The broadest commercial class of accelerometers is the longitudinal type. This type fills the requirements falling between the above extremes. Longitudinal type accelerometers have good sensitivity over a wide frequency band, and are rugged enough for general purpose industrial use. Longitudinal type accelerometers are the key component for most machinery diagnostic equipment, inclinometers, and vibration monitoring. There are many major manufacturers of this type of accelerometer, such as the PCB (registered trademark) piezoelectric accelerometers by Piezotronics Co. and Model 793 Piezoelectric Accelerometer by Wilcoxon Research, of Rockville Md. The scope of the present invention is intended to be limited to this class of piezoelectric accelerometers, the important high-volume commercial type accelerometers.

Further, conventional piezoelectric accelerometers have a mass supported by a piezoelectric element with electrodes At frequencies much below the spring-mass resonance of the system, the seismic mass exerts a stress on the piezoelectric support which is proportional to the acceleration of the system. Under such a stress, the piezoelectric element delivers a charge or voltage to the electrodes which is proportional to the stress. Hence the output charge or voltage is proportional to the acceleration of the system.

For a high quality measurement accelerometer, such a conceptually simple configuration presents some fabrication and operation difficulties. In a typical embodiment, the accelerometer is sealed in a pressure-tight metal container to reduce the effect of environmental pressure variations. This metal container also shields against stray electrical and magnetic fields. To reduce the influence of temperature fluctuations, it may be surrounded by a thermal mass. Alternative arrangements of the mass and piezoelectric elements effects have been devised to reduce interfering effects such as nonlinearities due to high acceleration, and the sensitivity to base strain. Because of the many components involved, the fabrication process can be labor intensive.

For example, one application is in 1–3 composite transducers. Such transducers include a dense array of piezoelectric rods embedded in a soft matrix. The Naval Research Laboratory has a long and continuing interest in the development of accelerometer arrays, particularly for underwater acoustic velocity sensing. Such arrays are formed from commercially available accelerometers.

Commercially available measurement accelerometers are typically constructed in multiple labor-intensive fabrication operations which result in high cost.

SUMMARY AND OBJECTS OF THE INVENTION

Accordingly, it is the primary object of the present invention to overcome the disadvantages of the prior art piezoelectric accelerometers by providing a method of manufacturing piezoelectric accelerometers in a monolithic manufacturing process which reduces the labor required by prior art processes.

It is also an object of the present invention to provide such a piezoelectric accelerometer which is manufactured by such a labor reducing process.

A further object of the present invention is the provision of such a piezoelectric accelerometer which is relatively less expensive to manufacture than presently available piezoelectric accelerometers.

Yet another object of the invention is to provide a piezoelectric accelerometer manufactured in such a less expensive manner which is of a quality competitive with presently available piezoelectric accelerometers.

The above and other objects of the present invention which will become apparent hereinafter are achieved according to the invention by the provision of a new manufacturing approach to the construction of accelerometers or accelerometer arrays These and other features, objects and advantages of the invention will become apparent upon consideration of the following detailed description wherein preferred embodiments of the invention are illustrated and described and the drawings in which:

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DESCRIPTION OF THE PREFERRED EMBODIMENTS

Figure 1B:
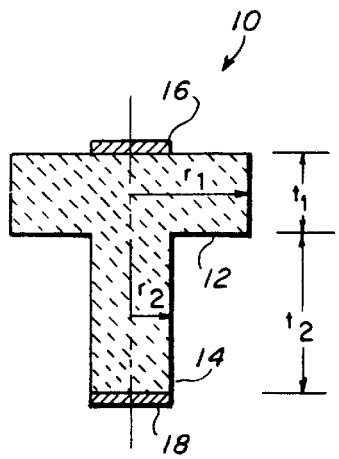
FIG. 1(b) is a front view of the piezoelectric accelerometer made in accordance with the present invention, taken in cross-section along axis C—C of FIG. 1(a).
Figure 1A:
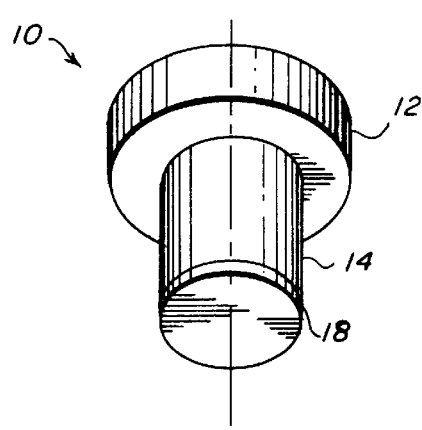
FIG. 1(a) is a schematic perspective drawing illustrating a first, generalized embodiment of a piezoelectric accelerometer in accordance with the present invention.

Referring now in detail to the drawings, there is illustrated in FIG. 1(a) and FIG. 1(b) a first embodiment of a piezoelectric accelerometer made in accordance with the present invention, generally designated by the reference numeral 10. Piezoelectric accelerometer 10 generally has three elements, a mass element 12, a piezoelectric accelerometer sensor element 14, and top and bottom electrodes 16 and 18, Top and bottom electrodes 16 and 18 are used to interconnect mass element 12 and piezoelectric accelerometer sensor element 14.

The piezoelectric accelerometer depicted in FIGS. 1(a) and 1(b) illustrates the principles of the invention.

The fabricated piezoelectric accelerometer depicted resembles a disk on a rod, with electrodes placed on top and bottom. The single-unit disk-rod combination can be fabricated of piezoelectric ceramic of density "rho." The top disk-like portion or element 12 is symmetrically arranged about a central longitudinal axis C—C, has a radius $r_1$ and a length $t_1$, and serves primarily as a mass.

The rod-like portion, or piezoelectric accelerometer sensor element 14, serves primarily as the sensor. Rod-like portion, or piezoelectric accelerometer sensor element 14 is similarly symmetrically arranged about central longitudinal axis C—C and has a radius $r_2$ and a length $t_2$.

Separating the illustrated geometry into two sections, sensor element 14 behaves as a standard accelerometer. The strain developed at distance t (measured from the bottom of the device) is due primarily to the mass of the top "disk" portion, mass element 12. If we ignore the charge contribution of the top portion and the mass contribution of the bottom portion, then the acceleration sensitivity is just the usual:

$$S \cong g_{33} t_2 \frac{\text{Mass}_{disk}}{\text{Area}_{rod}} \qquad \text{Eq. 1}$$

where the sensitivity S is conventionally expressed in units of Volts/g and where $g_{33}$ is the usual piezoelectric constant of the material. A somewhat better approximation from a simple analysis which includes the piezoelectric contribution of the disk and the mass loading effect of the rod, by integrating the charge developed as a function of height over the region between the electrodes, is:

$$S = g_{33} \text{rho} \left[ \frac{r_1^2}{r_2^2} t_1 t_2 + \frac{t_1^2 + t_2^2}{2} \right] \qquad \text{Eq. 2}$$

An important feature of the invention is that it can be fabricated in one piece using the injection molding process. The performance of the accelerometer in accordance with the invention is that it is competitive with good instrumentation accelerometers. For example, if the top disk 12 is 6 mm in radius and 2 mm tall, and the bottom rod 14 is 2 mm in diameter and 4 mm tall then the sensitivity of such a device constructed of PZT-5A material would be approximately 0.114 V/g. The minimum detectable acceleration over a 20 kHz bandwidth is quite low—approximately 80 μg. The high frequency limit will be set by the bending mode of support, which occurs at approximately 20 kHz.

Figure 5A:
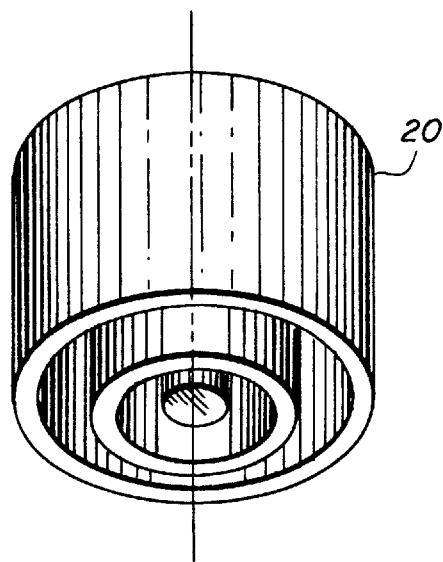
FIG. 5(a) is a schematic perspective drawing illustrating a specific embodiment of a piezoelectric accelerometer in accordance with the present invention.
Figure 5B:
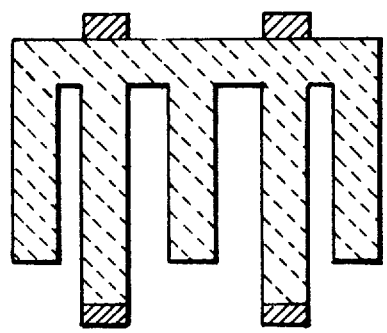
FIG. 5(b) is a front view of the piezoelectric accelerometer made in accordance with the present invention, taken in cross-section along axis C—C of FIG. 5(a).

Referring now to FIGS. 5(a) and 5(b), an additional embodiment of the invention is illustrated. According to this embodiment a piezoelectric accelerometer is generally designated by the reference numeral 20. Piezoelectric accelerometer 20 generally has three elements, a mass element 22, a piezoelectric accelerometer sensor element 24, and top and bottom electrodes 26 and 28, respectively. Top and bottom electrodes 26 and 28 are used to interconnect mass element 22 and piezoelectric accelerometer sensor element 24.

Here the principal sensor portion is a cylindrical ring, while much of the remaining volume serves primarily as the mass. For the same cylindrical volume as that discussed with regard to the first embodiment, a sensor of this alternative geometry has comparably good sensitivity and low noise. The principal advantage of the second embodiment is a higher frequency response due to an increased shear rigidity; in this case the lowest mode does not appear until 50 kHz. This geometry can also provide some thermal and electrical shielding of the sensor portion, particularly if the top electrode is extended to include the entire top and outer edge.

Figure 2:
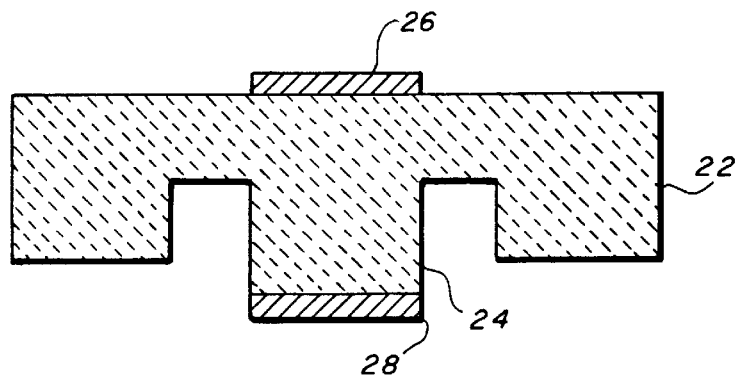
FIG. 2 is a cross-sectional, front view illustrating a second, more specific embodiment of a piezoelectric accelerometer in accordance with the present invention.
Figure 3:
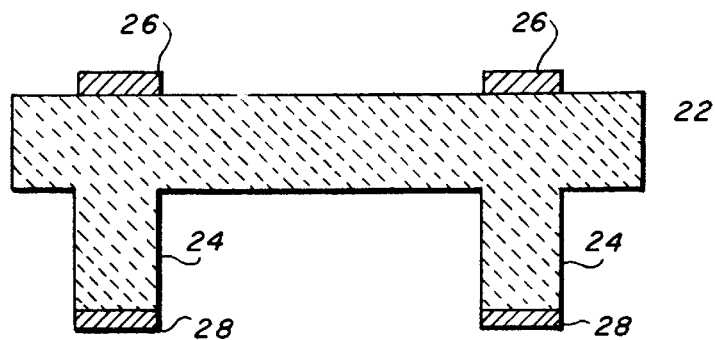
FIG. 3 is a cross-sectional, front view illustrating a third embodiment of the piezoelectric accelerometer made in accordance with the present invention.
Figure 4:
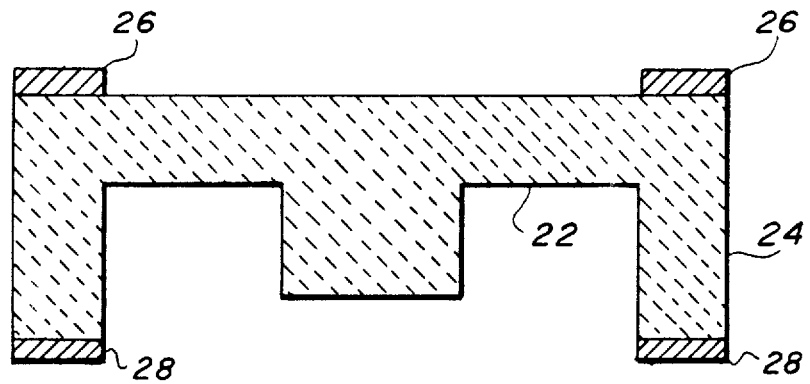
FIG. 4 is a cross-sectional, front view illustrating yet another embodiment of a piezoelectric accelerometer in accordance with the present invention.

FIGS. 2 through 4 illustrate a variety geometric shapes which the piezoelectric accelerometer according to the invention may take. FIGS. 1(a) and 1(b) illustrate a generalized shape, and FIGS. 5(a) and 5(b) a very specific geometry, with FIGS. 2 through 4 falling somewhere in between. FIGS. 2 through 4 are numbered according to the system described hereinabove for FIGS. 5(a) and 5(b).

Manufacturing Process

A critical feature of the invention is the ability to form the two key components of the accelerometer, namely the mass and the sensor elements, as one monolithic structure in one injection-molded fabrication process. Applying this feature to generally utilized manufacturing processes, molds would be designed to simultaneously form multiple units, thereby further and significantly reducing labor cost.

The accelerometer also lends itself to inclusion as a component in other co-formed injection molded piezoelectric elements. For example, the construction of large area integrating sensor/actuator combinations are currently very costly. To obtain a good average response, a large number of acceleration sensors must be used. Currently the accelerometers must be purchased as single units and separately wired. The present invention greatly reduces this cost by permitting a large array of accelerometers to be included within an injection-molded piezoelectric actuator or pressure sensor. For example, an accelerometer array could thus be included in the commercially available MSI 1-3 composite actuator at little added cost.

In addition to a one-step injection molding process additional fabrication methods are available in accordance with the invention. For example, press molding, powder sintering, slip casting, milling, or other ceramic molding and fabrication processes, may be used.

Additional Embodiment and Features

The embodiments illustrated in FIGS. 1(a), 2 through 4, and 5(a) are but a small sample of those intended under the present invention. Cylindrical geometry was used only to simplify the presentation, and other geometries may be used.

Other variations on previous accelerometers can also be fabricated using this approach. For example, the Shear Mode accelerometer can be implemented.

Additionally, other auxiliary structural members can be co-formed to further reduce construction costs. As an example, the side walls of a pressure-isolating container can be easily included.

For these reasons, inter alia, it will be appreciated that while preferred embodiment of the invention have been illustrated and described in detail herein, changes and additions may be had therein and thereto without departing from the spirit of the invention. Reference should, accordingly, be had to the appended claims in determining the true scope of the invention.

What is claimed is:

1. A monolithic piezoelectric accelerometer of the longitudinal type, comprising:

a monolithic structure having a longitudinal axis and further comprising:

piezoelectric means for generating a voltage in response to longitudinal acceleration of said monolithic monolithic structure; and electrodes in contact with said monolithic structure, for outputting said voltage;

wherein said accelerometer has a lateral axis in which the monolithic structure is formed so as to have a sensor element extending coincidentally with the longitudinal axis, and wherein the monolithic structure is further formed so as to have an inertial mass element extending coincidentally with the longitudinal axis and externally of the sensor element in the direction of the lateral axis.

2. A monolithic piezoelectric accelerometer according to claim 1 and having a central portion in which the monolithic structure is further formed so that said central portion has an aperture which opens in the direction of the longitudinal axis.

3. A monolithic piezoelectric accelerometer according to claim 2 in which the monolithic structure is further formed so as to have a mass element extending in the direction of the longitudinal axis and positioned internally in the direction of the lateral axis within said aperture.

* * * * *